(12) United States Patent
Schwartz et al.

(10) Patent No.: US 8,587,788 B2
(45) Date of Patent: Nov. 19, 2013

(54) MULTI-OSCILLATOR SOLID-STATE LASER GYRO PASSIVELY STABILIZED BY A FREQUENCY-DOUBLING CRYSTAL DEVICE

(75) Inventors: Sylvain Schwartz, Saint-Remy les Chevreuse (FR); Gilles Feugnet, Palaiseau (FR); Jean-Paul Pocholle, La Norville (FR)

(73) Assignee: Thales, Neuilly sur Seine (FR)

( * ) Notice: Subject to any disclaimer, the term of this patent is extended or adjusted under 35 U.S.C. 154(b) by 103 days.

(21) Appl. No.: 13/102,741

(22) Filed: May 6, 2011

(65) Prior Publication Data
US 2011/0273720 A1    Nov. 10, 2011

(30) Foreign Application Priority Data
May 7, 2010    (FR) ..................................... 10 01969

(51) Int. Cl.
| | |
|---|---|
| *G01B 9/02* | (2006.01) |
| *G01C 19/66* | (2006.01) |
| *H01S 3/03* | (2006.01) |
| *H01S 3/00* | (2006.01) |
| *H01S 3/083* | (2006.01) |

(52) U.S. Cl.
USPC ................ 356/467; 356/484.02; 356/484.05; 372/94; 372/37; 372/61

(58) Field of Classification Search
USPC ........... 356/467; 359/484.02, 484.05; 372/94, 372/37, 61
See application file for complete search history.

(56) References Cited

U.S. PATENT DOCUMENTS

| | | |
|---|---|---|
| 3,854,819 A | 12/1974 | Andringa |
| 7,230,686 B1 | 6/2007 | Schwartz et al. |
| 7,319,513 B2 | 1/2008 | Schwartz et al. |
| 7,446,879 B2 | 11/2008 | Feugnet et al. |
| 7,474,406 B2 | 1/2009 | Feugnet et al. |
| 7,548,572 B2 | 6/2009 | Schwartz et al. |
| 7,561,275 B2 | 7/2009 | Feugnet et al. |
| 7,589,841 B2 | 9/2009 | Schwartz et al. |
| 7,710,575 B2 | 5/2010 | Schwartz et al. |
| 2004/0202222 A1 | 10/2004 | Pocholle et al. |

(Continued)

FOREIGN PATENT DOCUMENTS

| | | |
|---|---|---|
| EP | 0 429 319 A1 | 5/1991 |
| EP | 0429319 * | 5/1991 |

(Continued)

OTHER PUBLICATIONS

Sylvain Schwartz et al., "Mode-Coupling Control in Resonant Devices: Application to Solid-State Ring Lasers", Physical Review Letters 97, 093902-1-093902-4, Sep. 1, 2006.

*Primary Examiner* — Tarifur Chowdhury
*Assistant Examiner* — Sunghee Y Gray
(74) *Attorney, Agent, or Firm* — Baker & Hostetler LLP

(57) ABSTRACT

A laser gyro for measuring the angular velocity or the angular position relative to a defined rotation axis includes: an optical ring cavity; a solid-state amplifying medium; and a non-reciprocal magneto-optic device; which are arranged so that four linearly polarized propagation modes can propagate within the cavity, the magneto-optic device introducing a frequency bias between the modes propagating in a first direction and the modes propagating in the opposite direction. In the device, the cavity also includes a stabilizer device for stabilizing the intensity of the four propagation modes at substantially equivalent levels, said device comprising at least one optical element made of a non-linear crystal of the frequency-doubling type.

8 Claims, 4 Drawing Sheets

(56) References Cited

U.S. PATENT DOCUMENTS

2009/0304033 A1* 12/2009 Ogilvy et al. .................. 372/10
2010/0123901 A1 5/2010 Schwartz et al.
2010/0265513 A1 10/2010 Schwartz et al.

FOREIGN PATENT DOCUMENTS

| FR | 2 876 447 A1 | 4/2006 |
|---|---|---|
| FR | 2 925 153 A1 | 6/2009 |
| WO | 2007/068652 A1 | 6/2007 |

* cited by examiner

MULTI-OSCILLATOR SOLID-STATE LASER GYRO PASSIVELY STABILIZED BY A FREQUENCY-DOUBLING CRYSTAL DEVICE

CROSS-REFERENCE TO RELATED APPLICATION

This application claims priority to foreign French patent application No. FR 1001969, filed on May 7, 2010, the disclosure of which is incorporated by reference in its entirety.

FIELD OF THE INVENTION

The field of the invention is that of laser gyros used notably in the aeronautical field for inertial navigation, and more particularly to that of solid-state laser gyros.

BACKGROUND

Most laser gyros commercially available at the present time consist of a cavity made of zerodur containing a helium/neon gas mixture, in which cavity two counterpropagating optical waves coexist, i.e. waves propagating in opposite directions inside the cavity. It is known that in this type of laser, when the rotation velocities are low, the two counterpropagating waves have the same frequency. This frequency-locking problem at low rotation velocities or "dead zone" problem is usually solved by making the cavity vibrate about its rotation axis by mechanical dithering. A rotation velocity sufficient to prevent frequency locking is thus artificially created. This technique is however a non-inconsiderable source of noise because of the "random walk" phenomenon corresponding to the accumulation of a random phase at each pass through the dead zone.

To eliminate these drawbacks, another type of laser gyro has been developed. The physical principal consists in making not two but four waves coexist in the cavity, corresponding to two orthogonal polarization states and two opposite propagation directions. The patent by K. Andringa with reference U.S. Pat. No. 3,854,819 describes a device of this kind. This type of laser, also called a "multi-oscillator laser gyro", associated with a magneto-optic frequency bias, makes it possible to eliminate the "dead zone" effect over the entire operating range of the laser gyro while still obviating, by an astute recombination of the four modes present in the laser cavity, fluctuations of said magneto-optic bias, which constitute without this a source with too large a drift for most laser gyro applications.

It is also possible to produce laser gyros with solid-state amplifying media, for example a laser-diode-pumped Nd:YAG crystal. The publication by S. Schwartz, G. Feugnet, P. Bouyer, E. Lariontsev, A. Aspect and J.-P. Pocholle published in Phys. Rev. Lett. 97, 093902 (2006) describes a laser gyro of this type.

In these devices, the competition between modes is no longer counterbalanced by the Doppler effect, as is the case in helium-neon gas laser gyros, but by an additional stabilizing device, for example the use of a feedback loop creating differential losses proportional to the difference in intensity between the counterpropagating modes of the laser, this being referred to as "active stabilization". Such a device, although it proves to be relatively simple to implement for a solid-state laser gyro of the "two wave" type as described in the patent by S. Schwartz, G. Feugnet et J.-P. Pocholle with the reference U.S. Pat. No. 7,548,572, is however more complicated to implement in its "four wave" or multi-oscillator version as described in the patent by S. Schwartz, G. Feugnet and J.-P. Pocholle with the reference U.S. Pat. No. 7,230,686. FIG. 1 shows a laser gyro of this type, which essentially comprises:
- an optical ring cavity 1 comprising at least one partially reflecting mirror 11, enabling the counterpropagating modes outside the cavity 1 to be treated;
- a solid-state amplifying medium 2;
- a slaving device 3 controlling the optical rotator or rotators 4 and 5 (dotted arrows in FIG. 1);
- a measurement device 6;
- an optical system comprising:
    - a first optical assembly consisting of a first non-reciprocal optical rotator 5 and of a reciprocal optical rotator 4;
    - a second optical assembly consisting of a first spatial filtering device 7 and of a first polarization-splitting optical element 8;
    - a third optical assembly consisting of a second spatial filtering device 10 and of a second polarization-splitting optical element 9, the second optical assembly and the third optical assembly being placed on either side of the first optical assembly, the third optical assembly being placed symmetrically with respect to the second optical assembly; and
    - a fourth optical assembly consisting, in succession, of a first quarter-wave plate 12, a second non-reciprocal optical rotator 14 and a second quarter-wave plate 13, the principal axes of which are perpendicular at 90° to those of the first quarter-wave plate.

SUMMARY OF THE INVENTION

The laser gyro according to the invention is simpler to produce. It employs a multi-oscillator solid-state laser gyro no longer using an active stabilizing device acting on the differential losses, but a passive stabilizing device involving non-linear effects in the laser cavity, much simpler to implement.

More precisely, the subject of the invention is a laser gyro for measuring the angular velocity or the relative angular position along a defined rotation axis, said laser gyro comprising at least:
- on optical ring cavity;
- a solid-state amplifying medium; and
- a non-reciprocal magneto-optic device these being arranged so that four propagation modes can propagate within the cavity, the first propagation mode and the third propagation mode being linearly polarized in the same direction, the second propagation mode and the fourth propagation mode being linearly polarized perpendicular to the first mode and to the third mode, the first propagation mode and the second propagation mode propagating in a first direction in the cavity, the third propagation mode and the fourth propagation mode propagating in the opposite direction in the cavity, and the magneto-optic device introducing a frequency bias between the modes propagating in the first direction and the modes propagating in the opposite direction, characterized in that said cavity also includes a stabilizer device for stabilizing the intensity of the four propagation modes at substantially equivalent levels, said device comprising at least one optical element made of a non-linear crystal of the frequency-doubling type.

Preferably, the optical element is a birefringent crystal designed so as to generate, from a propagation mode having a first optical frequency, a light beam at a second optical frequency which is double the first frequency.

Advantageously, in a first configuration, the stabilizer device comprises two identical optical elements made of a birefringent crystal which are in the form of plates having parallel plane faces, the faces being perpendicular to the propagation axis of the various propagation modes, the two elements being assembled via a common face, and the crystallographic axis of the first element being perpendicular to the crystallographic axis of the second element. The optical element may be made of a barium beta-borate (BBO or βBaB$_2$O$_4$) crystal.

Advantageously, in a second configuration, the optical element comprises a stack of regularly alternating thin plane layers, of identical thickness, produced in the same negative uniaxial birefringent crystal, the faces of the various layers being perpendicular to the propagation axis of the various propagation modes, the optical axis of each layer being parallel to the plane of the layer and oriented in the same direction in the various layers, the polarization directions of the various propagation modes being oriented at 45° to said optical axis, and the sign of the effective non-linear coefficient of each layer being the reverse of that of the following thin layer. In this case, the thickness (Λ) of each layer is equal to Λ=2 mL$_C$, m being an odd integer, L$_C$ representing the coherence length, L$_C$ being equal to $$L_C = \frac{\lambda_1}{4(n_2 - n_1)},$$

and n$_2$ and n$_1$ being the optical indices of the crystal at the second optical frequency and at the first optical frequency, respectively. The optical element may be made of lithium niobate (LiNbO$_3$).

Advantageously, the amplifying medium acts as stabilizer device. In this case, the amplifying medium may be made of neodymium-doped yttrium calcium oxyborate (YCOB or YCa$_4$O(BO$_3$)$_3$) or neodymium-doped yttrium aluminium borate (YAB or YAl$_3$(BO$_3$)$_4$).

BRIEF DESCRIPTION OF THE DRAWINGS

The invention will be greater understood and other advantages will become apparent on reading the following description given by way of non-limiting example and together with the appended figures in which.

DETAILED DESCRIPTION

Figure 1:
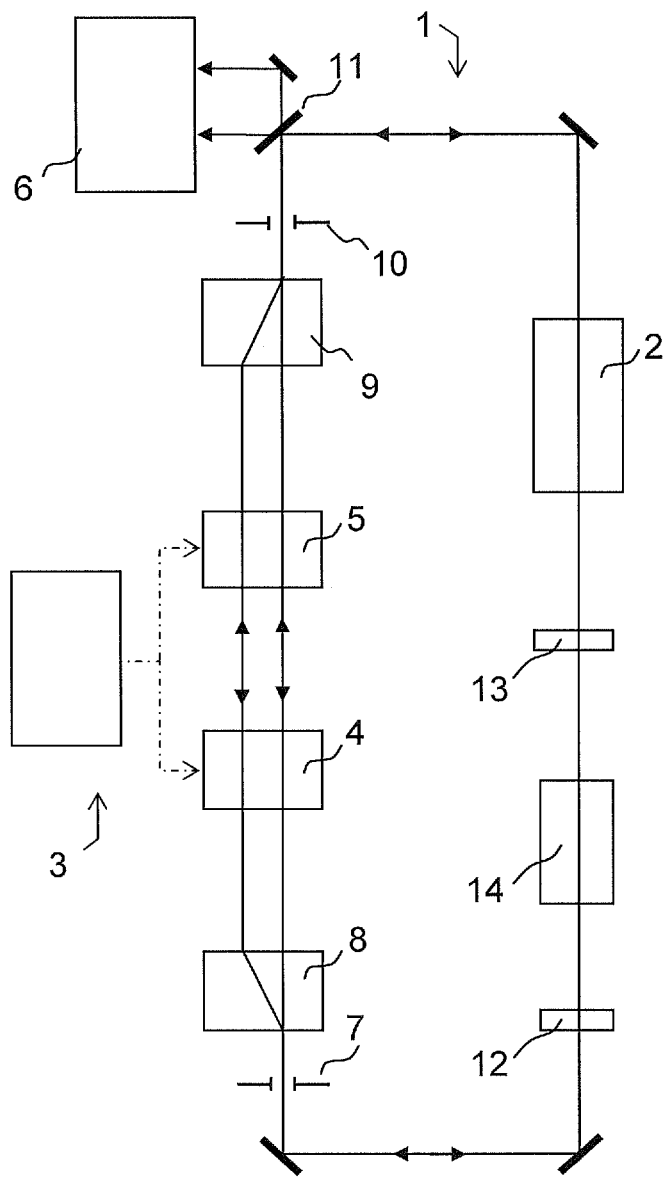
FIG. 1, already described, shows a solid-state laser gyro with four propagation modes according to the prior art.
Figure 2:
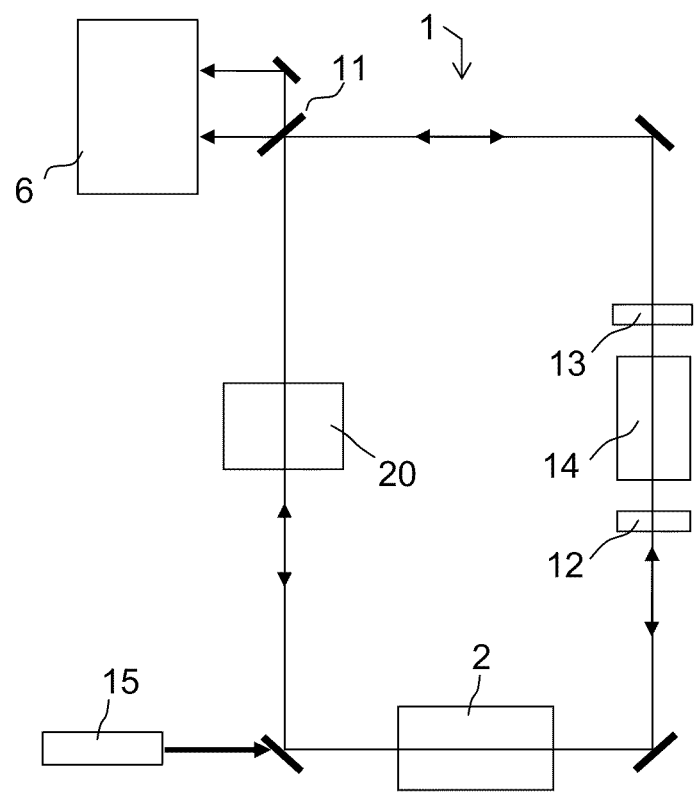
FIG. 2 shows a solid-state laser gyro with four propagation modes according to the invention.
Figure 3:
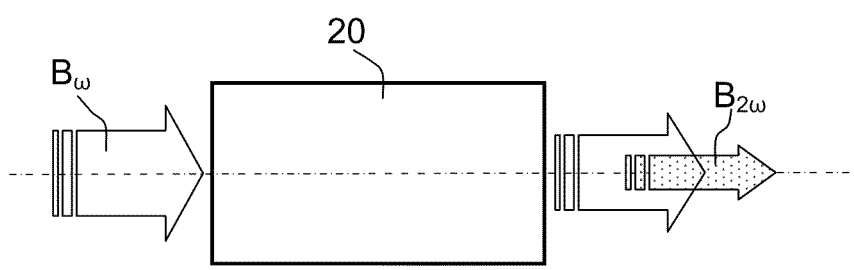
FIG. 3 shows the operating principle of a frequency-doubling crystal device.

The block diagram showing the principle of the invention is given in FIG. 2. It essentially comprises:

an optical ring cavity 1 comprising at least one partially reflecting mirror 11 for treating the counterpropagating modes outside the cavity 1. In FIG. 2, the cavity has a total of four plane mirrors. At least one of the mirrors of the cavity may be curved in order to guarantee optical stability of the cavity;

a solid-state amplifying medium 2;

a measurement device 6. This type of device is well known to those skilled in the art and will not be described in detail in the context of this invention;

an optical system comprising an optical assembly consisting in succession of a first quarter-wave plate 12, a second non-reciprocal optical rotator 14 and a second quarter-wave plate 13, the principal axes of which are at 90° to those of the first quarter-wave plate; and a stabilizer device 20 for stabilizing the intensity of the propagation modes, comprising at least one optical element made of a non-linear crystal of the frequency-doubling type. The term "frequency-doubling device" is understood to mean a device as shown in FIG. 3, that is to say, when an optical wave B$_\omega$ at a frequency ω passes through the device 20, a portion of the transmitted beam is converted by the device into a beam B$_{2\omega}$ generated at a frequency 2ω.

Four propagation modes propagate inside the cavity, the first propagation mode and the third propagation mode being linearly polarized in the same direction, the second propagation mode and the fourth propagation mode being linearly polarized perpendicular to the first mode and to the third mode, the first propagation mode and the second propagation mode propagating in a first direction in the cavity, and the third propagation mode and the fourth propagation mode propagating in the opposite direction in the cavity.

The solid-state gain medium may for example be an Nd:YAG crystal pumped by a laser diode 15 as shown in FIG. 2. At least one of the mirrors of the cavity is treated so as to transmit the optical radiation output by the laser diode 15. Such a medium must be able to provide a substantially equivalent gain to the two polarization states so as to allow the generation and circulation of propagation modes polarized along two perpendicular polarization axes. Use as such of a polarizing gain medium, such as Nd:YVO$_4$, is therefore excluded. Advantageously, the gain medium may consist of an Nd:YAG crystal cut along one of its crystallographic axes and oriented according to the eigenstates of the laser cavity, as described in the patent application WO 2009/077314 by S. Schwartz, G. Feugnet and J.-P. Pocholle so as to minimize the coupling between orthogonal modes. In the latter case, the pumping used is either depolarized, or linearly polarized at 45° to the axes of the crystal.

The magneto-optic bias generator provides the frequency splitting of the counterpropagating modes and thus eliminates the "dead zone" effect. As shown in FIG. 2, such an element typically consists of two quarter-wave plates placed on either side of a Faraday rotator, which may for example be a crystal placed in a solenoid. The eigenstates of the cavity, which are linear outside this element, become circular under the action of a first quarter-wave plate and undergo a phase shift proportional to the magnetic field of the Faraday rotator before again becoming linear under the action of the second plate.

The eigenstates of the laser cavity thus defined are linear outside the magneto-optic bias generator and circular within it. The eigenvalues associated with these eigenstates are principally determined by three potential sources of influence;

the residual birefringence of the cavity;

the magneto-optic bias generator; and the Sagnac effect due to the rotation of the cavity.

Figure 4:
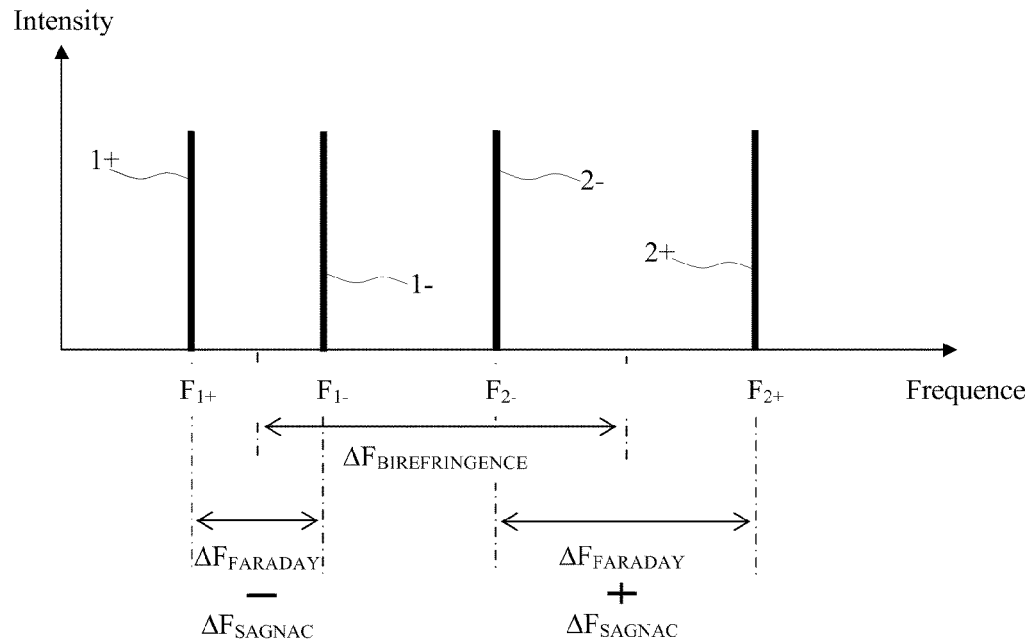
FIG. 4 shows the various frequencies of the four propagation modes circulating in the cavity.

The principle of the multi-oscillator laser gyro consists in adjusting the first two bias sources so as to frequency-split the four modes of the cavity in order to eliminate the dead zone and obtain a linear Sagnac response independently of the fluctuations of said biases. This principle is illustrated in FIG. 4 in the case of the invention. This figure shows the eigenfrequencies $F_{1+}$, $F_{1-}$, $F_{2+}$ and $F_{2-}$ of the four eigenmodes of the laser cavity under the effect of the various influences mentioned above. The two pairs of orthogonal modes (denoted by 1 and 2) are frequency-split by the birefringence of the cavity. The two pairs of counterpropagating modes (denoted by + and −) are frequency-split by the magneto-optic bias generator and by the Sagnac effect when the laser is rotating. The signal is then detected by causing beating between the modes of the same polarization state, namely the (1+) and (1−) modes on the one hand and the (2+) and (2−) modes on the other. If the magneto-optic bias is called $\Delta F_{FARADAY}$ and the frequency difference induced by the Sagnac effect is called $\Delta F_{SAGNAC}$, then the beating between the (1+) and (1−) modes will provide the $\Delta F_{FARADAY} - \Delta F_{SAGNAC}$ measurement, whereas the beating between the (2+) and (2−) modes will provide the $\Delta F_{FARADAY} + \Delta F_{SAGNAC}$ measurement. By taking the difference between these two measurements, $2\Delta F_{SAGNAC}$ is obtained independently of any fluctuations in the value of the bias. This device also has the advantage of being twice as sensitive as a conventional laser gyro.

It should be noted that a non-planar configuration of the cavity in which the eigenstates of the cavity are circular may be used. Helium-neon multi-oscillator laser gyros may have configurations of this type. In such a case, the device for generating the magneto-optic bias is composed solely of the Faraday rotator, with no quarter-wave plates. The measurement principles remain the same.

As mentioned, the device for stabilizing the intensity of the four propagation modes having substantially equivalent levels comprises at least one optical element made of a non-linear crystal of the frequency-doubling type. The principle is the following: since the frequency doubling is proportional to the intensity of the initial mode, such a device will induce, for each of the modes in the cavity, losses that are higher the higher the intensity of the modes, and thus stabilize the bidirectional operation of the laser. To ensure that the four modes coexist in the cavity, the doubling is necessarily carried out on the two orthogonal polarization states corresponding to the eigenmodes of the laser. It is important for the doubled beams not to propagate inside the cavity, so as to prevent the principal modes from being parasitized. For this purpose, it is advantageous for the mirrors of the cavity to have a treatment intended to introduce large losses at the doubled frequency, that is to say the mirror treatment has a low reflection coefficient at the doubled frequency. This presents no technical difficulty in so far as, in principle, the doubled frequency is well away from the initial frequency.

Assuming that the doubled intensity per unit time may be expressed as $KI/I_{SAT}$, K being the doubling coefficient, I being the intensity of the doubled mode and $I_{SAT}$ being the saturation intensity, then the self-stabilization condition may be expressed as $K > \gamma/(2\Omega^2 T_1^2)$ in which $\gamma$ is the level of losses per unit time, $\Omega$ is the frequency bias induced by the magneto-optic device and $T_1$ is the life time of the excited level, which is of the order of a few hundred microseconds.

There are various possible configurations for producing the frequency-doubling device. As non-limiting examples, the configurations detailed below are produced from birefringent crystals. It is known in fact that, in order for frequency doubling to be possible in a given material, then the optical index of the material must be such that it satisfies a property called the phase tuning condition. The phase tuning condition forces the wavevectors $\vec{k}^{\omega}$ and $\vec{k}^{2\omega}$ associated with the fundamental angular frequency $\omega$ and the harmonic angular frequency $2\omega$ to be equal, which is expressed as: $\vec{k}^{2\omega} = 2\vec{k}^{\omega}$ where $$k^{\Omega} = \frac{\Omega n^{\Omega}}{c}, n^{\Omega}$$

being the refractive index at the angle of frequency of the field $\Omega$. This results in the condition: $n^{2\omega} = n^{\omega}$.

The laws governing the spectral dispersion of the refractive index of isotropic solid media do not allow the above equality to be achieved. Only by using anisotropic birefringent materials is it possible to obtain this condition. In a birefringent medium, the refractive index depends on the polarization direction of the light beam that passes through it. However, there is at least one preferential direction for which the index is independent of the polarization direction. Such a direction is called the optical axis of the medium. This is denoted as the axis Z in FIGS. 5, 6 and 7 and is represented by a white arrow. In natural media, a distinction is made between:

uniaxial media possessing a single optical axis; and
biaxial media possessing two optical axes.

Uniaxial media have two principal refractive indices, called the ordinary index and the extraordinary index. In general, they are denoted by $n_o$ and $n_e$, respectively. The index difference $\Delta n$, equal to $n_e - n_o$, is then called the birefringence of the medium. This difference $\Delta n$ is zero along the optical axis Z and is maximum for a direction perpendicular to this axis. Two cases may be distinguished according to the sign of the birefringence:

$\Delta n > 0$: the medium is called a positive uniaxial medium;
$\Delta n < 0$: the medium is called a negative uniaxial medium.

In what follows, it is more particularly devices employing uniaxial birefringent crystals that are addressed.

Figure 5:
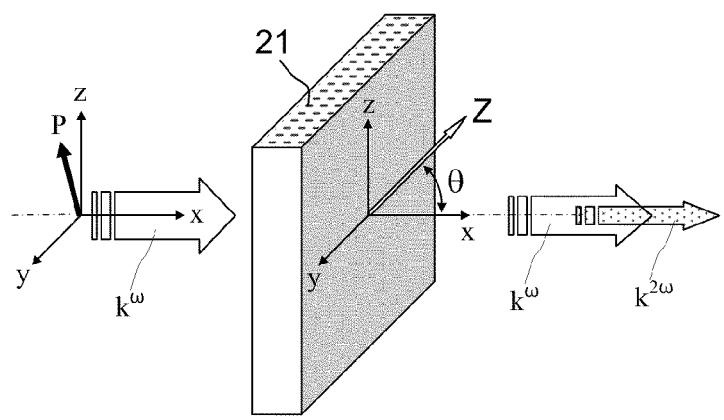
FIG. 5 shows the frequency-doubling principle for the propagation modes linearly polarized in a given direction for a crystal operating in phase-tuning mode.

FIG. 5 shows the propagation of a polarized mode inside a birefringent crystal 21 of optical axis Z in a referenced frame (x, y, z). The following conventions were adopted. The x-axis is oriented in the propagation direction of the mode, i.e. along the direction of the wavevector $\vec{k}^{\omega}$. The (x, z) plane containing the Z axis and the wavevector of the incident field is called the principal plane. The Z axis in this plane makes an angle $\theta$ with the x-axis. The polarization state Po of the field normal to this plane defines an ordinary wave, denoted "o", whereas a polarization state Pe lying in the principal plane defines an extraordinary wave, called "e". The refractive index for an ordinary wave does not depend on the propagation direction, whereas it varies for an extraordinary wave. Thus, the refractive index in an anisotropic crystal depends on the polarization state of the wave in question and on its propagation direction relative to the principal axes of the crystal. For propagation at an angle $\theta$ to the Z axis, the extraordinary wave sees an effective extraordinary refractory index:

$$\frac{1}{(n_e(\theta))^2} = \frac{\cos^2\theta}{(n_0)^2} + \frac{\sin^2\theta}{(n_e)^2} \quad \text{i.e. again:} \quad n_e(\theta) = n_o\left(\frac{1 + tg^2\theta}{1 + (n_0/n_e)^2 tg^2\theta}\right)^{1/2}.$$

Knowing the variation of the various optical indices with the wavelength, it is possible to determine, for a given material and for propagation modes at known wavelengths, if ranges of orientation $\theta$ exist for obtaining phase tuning. Thus, by employing a barium beta-borate (BBO or $\beta BaB_2O_4$) crystal it is possible to obtain phase tuning enabling a frequency-doubling operation to be carried out. For this type of crystal, the internal phase tuning angle $\theta_{AP}$ is equal to about 23°.

Figure 6:
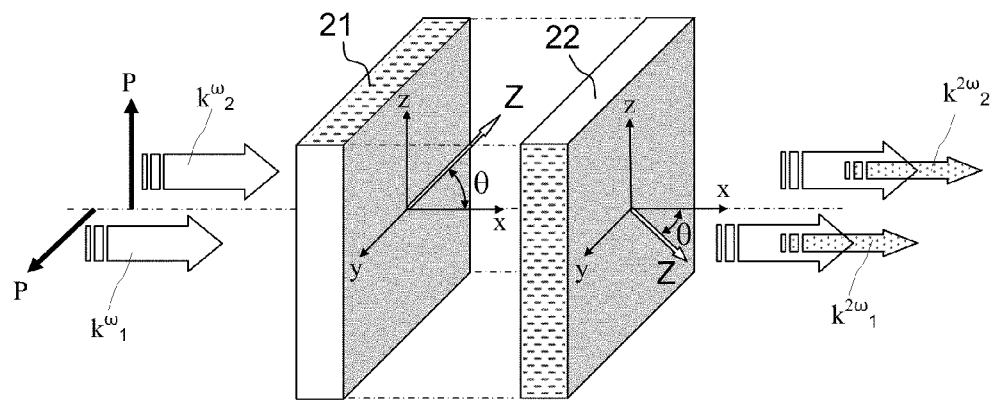
FIG. 6 shows the frequency-doubling principle for the propagation modes linearly polarized in a given direction and the propagation modes linearly polarized in a perpendicular direction for a device operating in phase-tuning mode.

The frequency-doubling stabilizer device must operate for both polarization states. To obtain this function, two crystals 21 and 22 mounted head to tail are inserted into the cavity, the crystallographic orientations of said crystals being turned through 90° so that the two polarization states of the counter-propagating waves circulating in the cavity are treated separately. FIG. 6 shows an arrangement of this type in exploded view. In reality, the crystals 21 and 22 are bonded together. The frequency doubling generated by the two crystals is the same whatever the polarization state. If the crystals are assembled by direct bonding (also called molecular adhesion), the effects of parasitic reflections in a monolithic configuration are reduced. As an example, the difference between the ordinary refractive index and the effective extraordinary refractive index $n_o - n_{e\ eff} = 1.86 \times 10^{-2}$ at a propagation wavelength of 1.064 μm.

Figure 7:
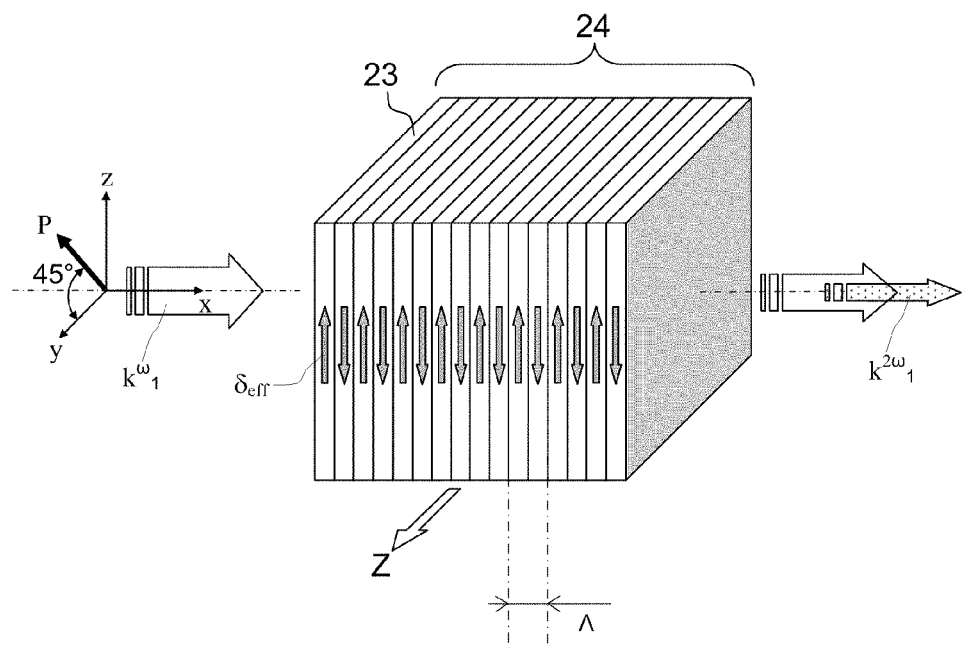
FIG. 7 shows the frequency-doubling principle for the propagation modes linearly polarized in a given direction and the propagation modes linearly polarized in a perpendicular direction for a device operating in quasi phase-tuning mode.

An alternative approach to phase tuning consists in using what are called QPT (quasi phase tuning) devices. As was mentioned, if the phase tuning is not perfect, frequency doubling cannot occur. However, it has been demonstrated that, if the phase mismatch is periodically zeroed, then frequency doubling can again occur. To achieve this property, the frequency-doubling device has a period structure 24 made up of crystalline layers 23 of the same material in which the sign of the effective non-linear coefficient of each layer is the reverse of that of the next thin layer, as illustrated in FIG. 7, in which the orientation of the non-linear coefficient $\delta_{eff}$ of each layer is represented by a gray arrow.

The spatial period Λ of this reversal of the non-linear coefficient is: $\Lambda = 2\ mL_C$ where m is the order of the quasi phase tuning and equal to an odd integer and $L_C$ represents the coherence length such that:

$$L_c = \frac{\lambda^\omega}{4(n^{2\omega} - n^\omega)}$$

where $\Lambda^\omega$ is the wavelength of the non-doubled mode, $n^\omega$ is the optical index at the frequency ω, and $n^{2\omega}$ is the optical index at the doubled frequency 2ω. The phase tuning condition associated with this interaction is: $\vec{k}^{2\omega} - 2\vec{k}^\omega - \vec{k} = 0$ where $\vec{k}$ is the wavevector of the periodic lattice for reversing the non-linear coefficient.

As was mentioned, depending on the polarization state P of the field related to the principal plane, an ordinary input wave "o" and an extraordinary wave "e" may be defined. It is possible to obtain quasi phase tuning for these two waves. In the same way, the doubled output waves may be ordinary or extraordinary waves. Thus, depending on whether the input and output waves are all ordinary or all extraordinary waves, the interactions are referred to as "eee" or "ooo". Thus, it has been demonstrated that, with a negative uniaxial $LiNbO_3$ crystal, of order 1, the period is equal to Λ=6.807 μm for an "eee" interaction, which is the most effective. This corresponds to an optical axis perpendicular to the plane of the layers periodically alternated in terms of the sign of the non-linear coefficient, as shown in FIG. 6. The effective non-linear coefficient is then expressed by the equation:

$$d_{eff} = \left(\frac{2}{m\pi}\right) d_{ij}$$

where $d_{ij}$ represents that element of the non-linear tensor in question which depends on the conditions for excitation along the o or e axes. Thus, by coupling the two counterpropagating waves to a non-linear crystal at 45° to the Z axis, the interaction can be made symmetrical, as illustrated in FIG. 6.

Advantageously, the gain medium and the passive stabilizing crystal are made of one and the same doped material, which has the required non-linear properties for ensuring both amplification and frequency doubling.

The invention claimed is:

1. A laser gyro for measuring an angular velocity or a relative angular position along a defined rotation axis, comprising:
    an optical ring cavity;
    a solid-state amplifying medium; and
    a non-reciprocal magneto-optic device;
    being arranged so that four propagation modes can propagate within the optical ring cavity, the first propagation mode and the third propagation mode being linearly polarized in the same direction, the second propagation mode and the fourth propagation mode being linearly polarized perpendicular to the first propagation mode and to the third propagation mode, the first propagation mode and the second propagation mode propagating in a first direction in the optical ring cavity, the third propagation mode and the fourth propagation mode propagating in an opposite direction of the first direction in the optical ring cavity, and the non-reciprocal magneto-optic device introduces a frequency bias between the first propagation and the third propagation modes propagating in the first direction and the second propagation and the fourth propagation modes propagating in the opposite direction, and
    wherein said optical ring cavity also includes a stabilizer device for stabilizing an intensity of the four propagation modes at substantially equivalent levels, said stabilizer device comprising at least one optical element made of a non-linear crystal of a frequency-doubling type,
    wherein the at least one optical element of the stabilizer device comprises two identical optical elements made of a birefringent crystal which are in the form of plates having parallel plane faces, the parallel plane faces being perpendicular to a propagation axis of the various propagation modes, the two identical optical elements being assembled via a common face, and a crystallographic axis of the first optical element being perpendicular to a crystallographic axis of the second optical element, and
    wherein the at least one optical element being the birefringent crystal is designed so as to generate, from a propagation mode having a first optical frequency ($\lambda_1$), a light beam at a second optical frequency ($\lambda_2$) which doubles the first optical frequency ($\lambda_1$).

2. The laser gyro according to claim 1, wherein the two identical optical elements are made of a barium beta-borate (BBO or $\beta BaB_2O_4$) crystal.

3. The laser gyro according to claim 1, wherein the solid-state amplifying medium acts as the stabilizer device.

4. The laser gyro according to claim 3, wherein the solid-state amplifying medium is made of neodymium-doped yttrium calcium oxyborate (YCOB or $YCa_4O(BO_3)_3$).

5. The laser gyro according to claim 3, wherein the solid-state amplifying medium is made of neodymium-doped yttrium aluminium borate (YAB or $YAl_3(BO_3)_4$).

6. A laser gyro for measuring an angular velocity or a relative angular position along a defined rotation axis, comprising:
- an optical ring cavity;
- a solid-state amplifying medium; and
- a non-reciprocal magneto-optic device;
- the optical ring cavity, the solid-state amplifying medium, and the non-reciprocal magneto-optic device being arranged so that four propagation modes can propagate within the optical ring cavity, the first propagation mode and the third propagation mode being linearly polarized in the same direction, the second propagation mode and the fourth propagation mode being linearly polarized perpendicular to the first propagation mode and to the third propagation mode, the first propagation mode and the second propagation mode propagating in a first direction in the optical ring cavity, the third propagation mode and the fourth propagation mode propagating in an opposite direction of the first direction in the optical ring cavity, and the non-reciprocal magneto-optic device introduces a frequency bias between the first propagation and the third propagation modes propagating in the first direction and the second propagation and the fourth propagation modes propagating in the opposite direction, and
- wherein said optical ring cavity also includes a stabilizer device for stabilizing an intensity of the four propagation modes at substantially equivalent levels, said stabilizer device comprising at least one optical element made of a non-linear crystal of a frequency doubling type, wherein the at least one optical element comprises a stack of regularly alternating thin plane layers, of identical thickness, produced in the same negative uniaxial birefringent crystal, the faces of the various alternating thin plane layers being perpendicular to the propagation axis of the various propagation modes, the optical axis of each alternating thin plane layer being parallel to a plane of the layer and oriented in the same direction in the various layers, the polarization directions of the various propagation modes being oriented at 45° to said optical axis, and the sign of the effective non-linear coefficient of each layer being the reverse of that of the following thin layer.

7. The laser gyro according to claim 6, wherein the thickness (A) of each layer is equal to $\lambda = 2\,mL_C$, m being an odd integer, $L_C$ representing the coherence length, $L_C$ being equal to $$L_C = \frac{\lambda_1}{4(n_2 - n_1)},$$

and $n_2$ and $n_1$ being the optical indices of the crystal at the second optical frequency and at the first optical frequency, respectively.

8. The laser gyro according to claim 6, wherein the optical element is made of lithium niobate ($LiNbO_3$).

* * * * *